(12) United States Patent
Deshpande

(10) Patent No.: US 8,103,896 B2
(45) Date of Patent: Jan. 24, 2012

(54) METHOD AND SYSTEM FOR I2C CLOCK GENERATION

(75) Inventor: Amrita Deshpande, Chandler, AZ (US)

(73) Assignee: NXP B.V., Eindhoven (NL)

( * ) Notice: Subject to any disclaimer, the term of this patent is extended or adjusted under 35 U.S.C. 154(b) by 785 days.

(21) Appl. No.: 12/294,867

(22) PCT Filed: Mar. 31, 2007

(86) PCT No.: PCT/IB2007/051163
§ 371 (c)(1),
(2), (4) Date: Sep. 26, 2008

(87) PCT Pub. No.: WO2007/113766
PCT Pub. Date: Oct. 11, 2007

(65) Prior Publication Data
US 2010/0223486 A1     Sep. 2, 2010

Related U.S. Application Data

(60) Provisional application No. 60/788,570, filed on Mar. 31, 2006, provisional application No. 60/830,309, filed on Jul. 11, 2006.

(51) Int. Cl.
*G06F 1/12* (2006.01)
*G06F 1/00* (2006.01)
(52) U.S. Cl. .......... 713/400; 713/401; 713/500
(58) Field of Classification Search .......... 713/400, 713/401, 500
See application file for complete search history.

(56) References Cited

U.S. PATENT DOCUMENTS

| 4,689,740 A | 8/1987 | Moelands et al. |
| 2005/0165989 A1* | 7/2005 | Kim .............. 710/260 |
| 2005/0228915 A1 | 10/2005 | Saripalli et al. |
| 2005/0268142 A1 | 12/2005 | Saripalli et al. |

FOREIGN PATENT DOCUMENTS

WO     96/37816     11/1996

OTHER PUBLICATIONS

Philips Semiconductors,"The I2C-bus specification Version 2.1" Jan. 1, 2000, Philips Semiconductors, Product Specification, pp. 1-46.*
The I2C Bus Specification, Version 2.1, Jan. 2000.
PCF8584 I2C Bus Controller, Oct. 1997, Philips Semiconductors.
PCA9564 Parallel Bus to I2C Controller, Jun. 2004, Philips Semiconductors.

* cited by examiner

*Primary Examiner* — Thomas Lee
*Assistant Examiner* — Phil Nguyen

(57) ABSTRACT

I²C clock generators are implemented using a variety of methods. Using one such method, a method is implemented using logic circuitry arranged in a state machine to control the clock signal (110) on the I²C bus. A first state (202) of the state machine determines whether to effect a clock stretching delay. A second state (206) of the state machine determines whether the I²C bus is configured to run in a standard clock mode or in another one of multiple faster clock modes. A third state (210) of the state machine drives the clock signal in one binary logic state for more than about 0.5 microseconds before allowing the clock signal (110) to be driven in the other binary logic state and allowing the clock signal to remain in the other binary logic state for more than about 0.5 microseconds.

12 Claims, 7 Drawing Sheets

METHOD AND SYSTEM FOR I2C CLOCK GENERATION

Figure 1:
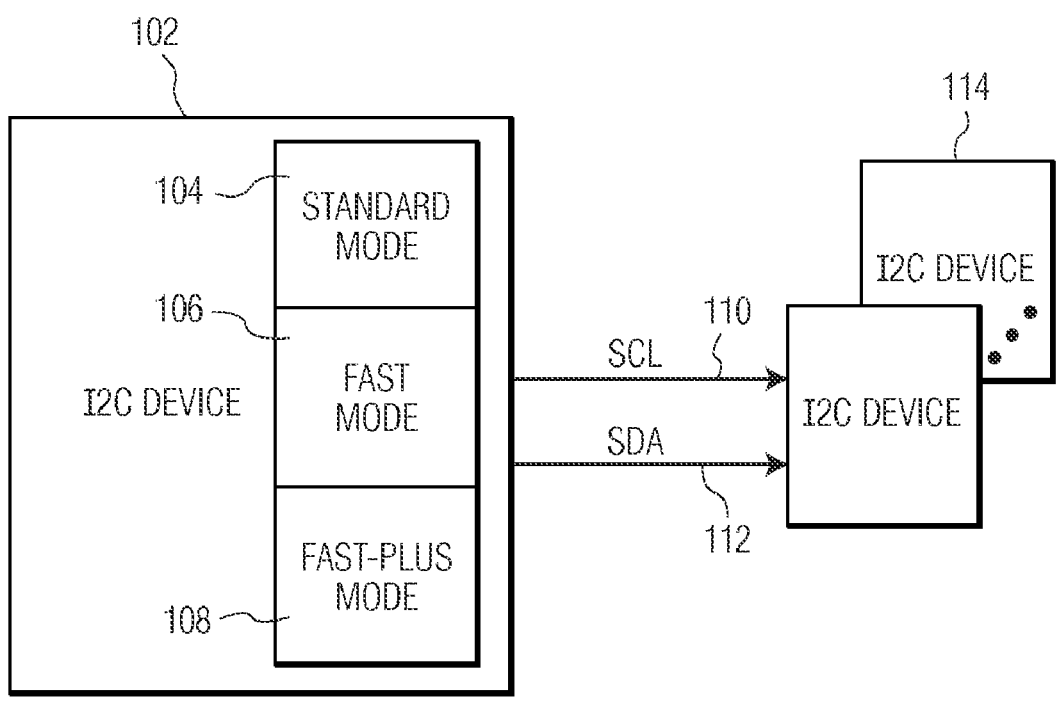

This application claims priority from earlier filed provisional application No. 60/788,570 titled, "State Machine for Generation of an I2C Clock," filed on Mar. 31, 2006.

The present invention relates generally to I²C clock generation and, more particularly, to the implementation of an I²C clock for Fast-Plus Mode.

Electrical systems often use interconnections to transmit information between components of the system. Such interconnections generally consist of one or more signal lines that taken together are also know as bus. To transmit the information, the components of the system must drive the voltage level of the bus line to the appropriate level. Often there are specifications that determine how fast or slow the voltage can change in a particular system. For example, some systems use a bus protocol known as the Inter-Integrated Circuit bus, or I²C bus.

The I²C bus is a control bus that provides the communications link between integrated circuits in a system. Developed by Philips in the early 1980s, this simple two-wire bus with a software-defined protocol has evolved to become the de facto worldwide standard for system control, finding its way into everything from temperature sensors and voltage level translators to EEPROMs, general-purpose I/O, A/D and D/A converters, CODECs, and microprocessors of all kinds. U.S. Pat. No. 4,689,740 of Moelands et al. titled, "Two-Wire Bus-System Comprising a Clock Wire and a Data Wire for Interconnecting a Number of Stations" describes a computer system that comprises a number of station which are interconnected by a clock bus wire and a data bus wire to form a wired logic bus from the signals generated thereon by the stations, and is incorporated by reference in its entirety. Additional information on the implementation of an I²C device may also be found in the I²C Specification titled, "The I²C Bus Specification (Version 2.1, January 2000)".

The I²C-bus also saves space and lowers overall cost. Using I²C specification, designers can move quickly from a block diagram to final hardware, simplifying the addition of new devices and functions to an existing bus interface. As the system evolves over several generations, I²C devices can easily be added or removed without impacting the rest of the system. The two-line structure means fewer trace lines, so the PCB can be much smaller. Debug and test are easier, too, since there are fewer trace lines and a relatively simple protocol.

There are several reasons why the I²C-bus has endured for more than 20 years. To begin, recently introduced hubs, bus repeaters, bidirectional switches and multiplexers have increased the number of devices the bus can support, extending the number of devices originally limited by a maximum bus capacitance of 400 pF. Also, software-controlled collision detection and arbitration prevent data corruption and ensure reliable performance, even in complex systems. Beyond performance, though, there is ease of use. Two simple lines connect all the ICs in a system. Any I²C device can be attached to a common I²C-bus, and any master device can exchange information with any slave device. The software-controlled addressing scheme eliminates the need for address-decoding hardware, and there's no need to design and debug external control logic because it's already provided by the I²C protocol. Additionally, the bus has kept pace with performance and today provides four levels of data rate transfer implemented using increasing clock speeds. For example, the clocks speeds can be up to 100 KHz in Standard mode, up to 400 KHz in Fast mode, up to 1 MHz in Fast-Mode plus and up to 3.4 MHz in High-Speed mode. While the High-Speed mode allows for clock speeds up to 3.4 MHz, it requires additional bus logic that is unnecessary for the Standard, Fast and Fast-Plus modes.

Per the Standard, Fast and Fast-Mode Plus specification, the on-chip I²C interface includes an open drain NMOS pull-down device, while a single pull-up resistor is common to all devices on the I²C bus. To compensate for the increased bus speed of Fast Mode Plus, the specification requires the capability to generate a clock signal with a frequency that is between 400 KHz and 1 MHz. To maintain backwards compatibility there also is a need to generate a clock signal that is compatible with Standard mode and Fast mode.

Generation of clock signals that are compatible with the Standard and Fast mode specifications is accomplished using various methods. One such method is implemented by devices PCF8584 and PCA9564, which are manufactured by Philips Semiconductor Corporation. Further information on these devices may be found in the datasheets "PCF8584 I²C Bus Controller (October 1997)" and "PCA9564 Parallel Bus to I²C Controller (June 2004)." Such devices, however, lack the ability to generate a clock signal that is compatible with the Fast-Plus mode.

These and other issues present problems in generating clock signals for an I²C bus. Accordingly, there is room for improvement in generating clock signals compatible with Fast-Plus mode for an I²C bus.

Various aspects of the present invention are directed to methods and arrangements for producing an I²C clock for Fast-Plus mode in a manner that addresses and overcomes the above-mentioned issues.

Consistent with one example embodiment, a method is implemented for use with an I²C bus having a clock signal. The method uses logic circuitry to control the clock signal on the I²C bus. The logic circuitry is arranged in a state machine. A first state of the state machine determines whether to implement a clock stretching delay. A second state of the state machine, in response to determining not to implement a clock stretching delay, determines whether the I²C bus is configured to run in a standard clock mode or in another one of multiple faster clock modes, one of which is a fast clock mode. A third state of the state machine, in response to determining that the device is not configured to run in either the standard clock mode or the fast clock mode, drives the clock signal in one binary logic state for more than about 0.5 microseconds and less than about 2.5 microseconds. The clock signal is then allowed to be driven in the other binary logic state. The clock signal remains in the other binary logic state for more than about 0.5 microseconds and less than about 2.5 microseconds before being driven back to the one binary logic state.

Consistent with another example embodiment, logic circuitry is implemented for controlling a clock signal of an I²C bus. The logic circuit contains a state machine arranged with multiple states. A first state determines whether to implement a clock stretching delay. In response to determining not to implement a clock stretching delay, a second state determines whether the I²C bus is configured to run in a standard clock mode or in another one of multiple faster clock modes, one of which is a fast clock mode. In response to determining that the device is not configured to run in either the standard clock mode or the fast clock mode, a third state drives the clock signal in one binary logic state for more than about 0.5 microseconds and less than about 2.5 microseconds. The clock signal is then allowed to be driven to the other binary logic state for more than about 0.5 microseconds and less than about 2.5 microseconds before driving the clock signal back to the one binary logic state.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 2:
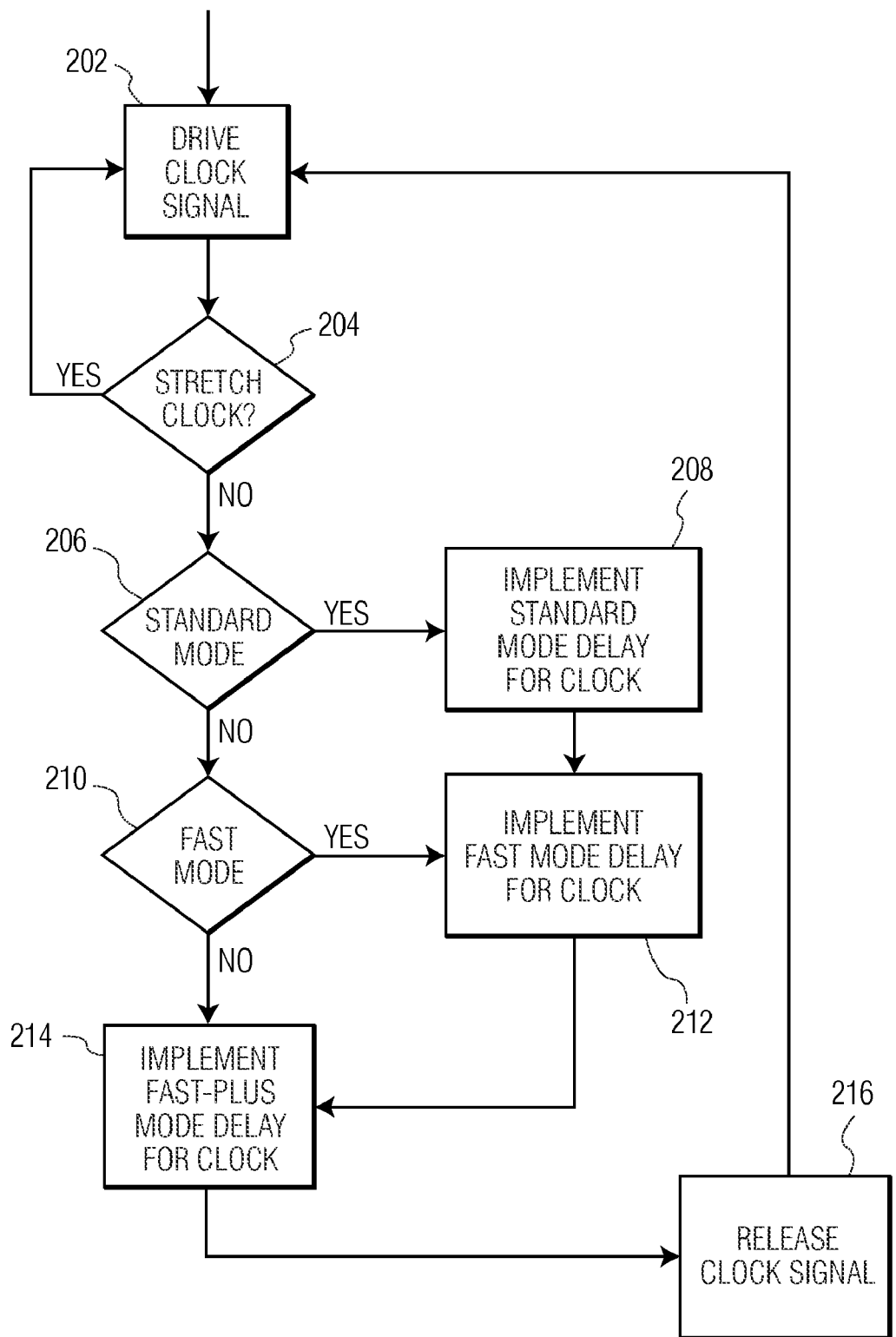
Figure 3A:
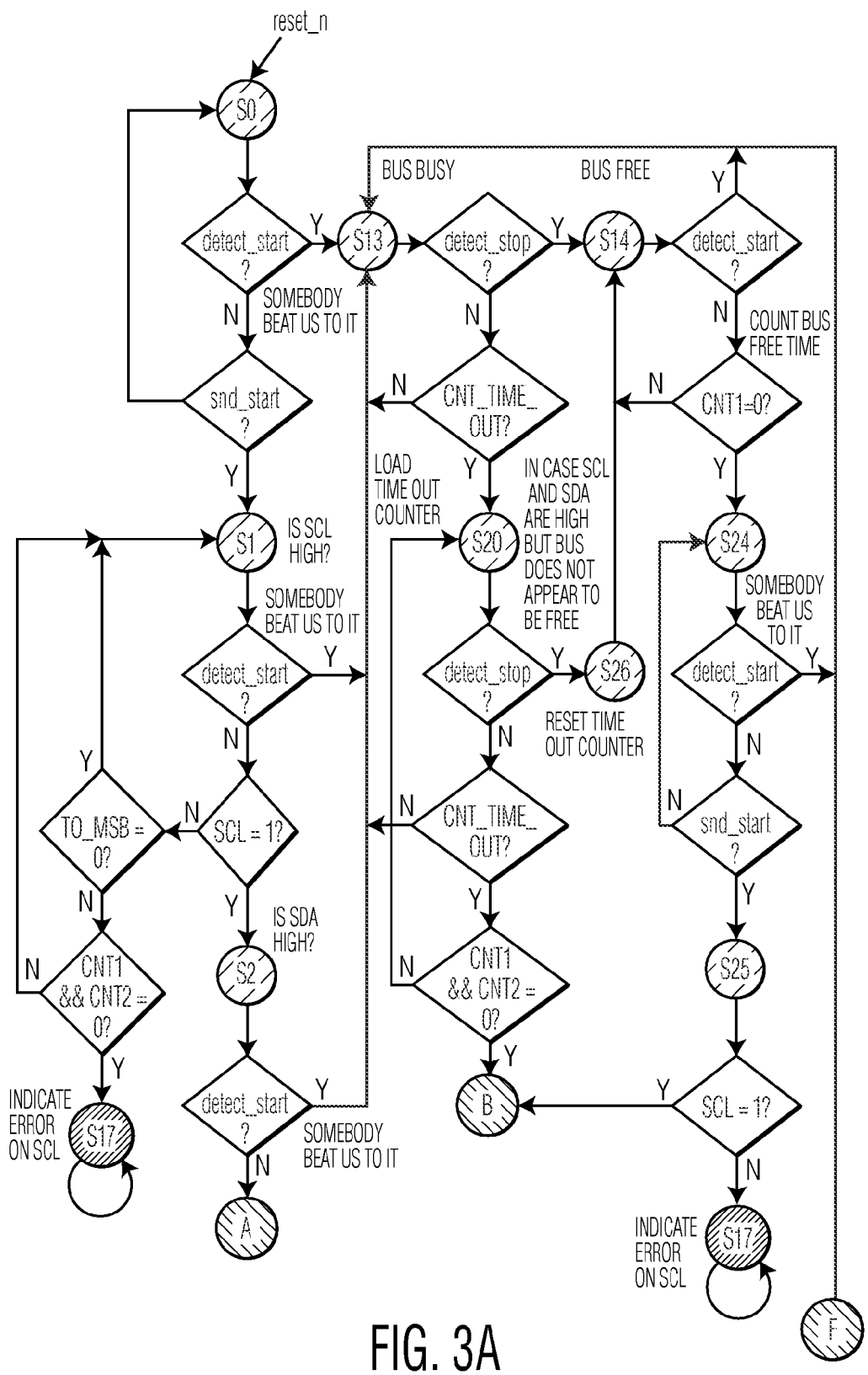
Figure 3B:
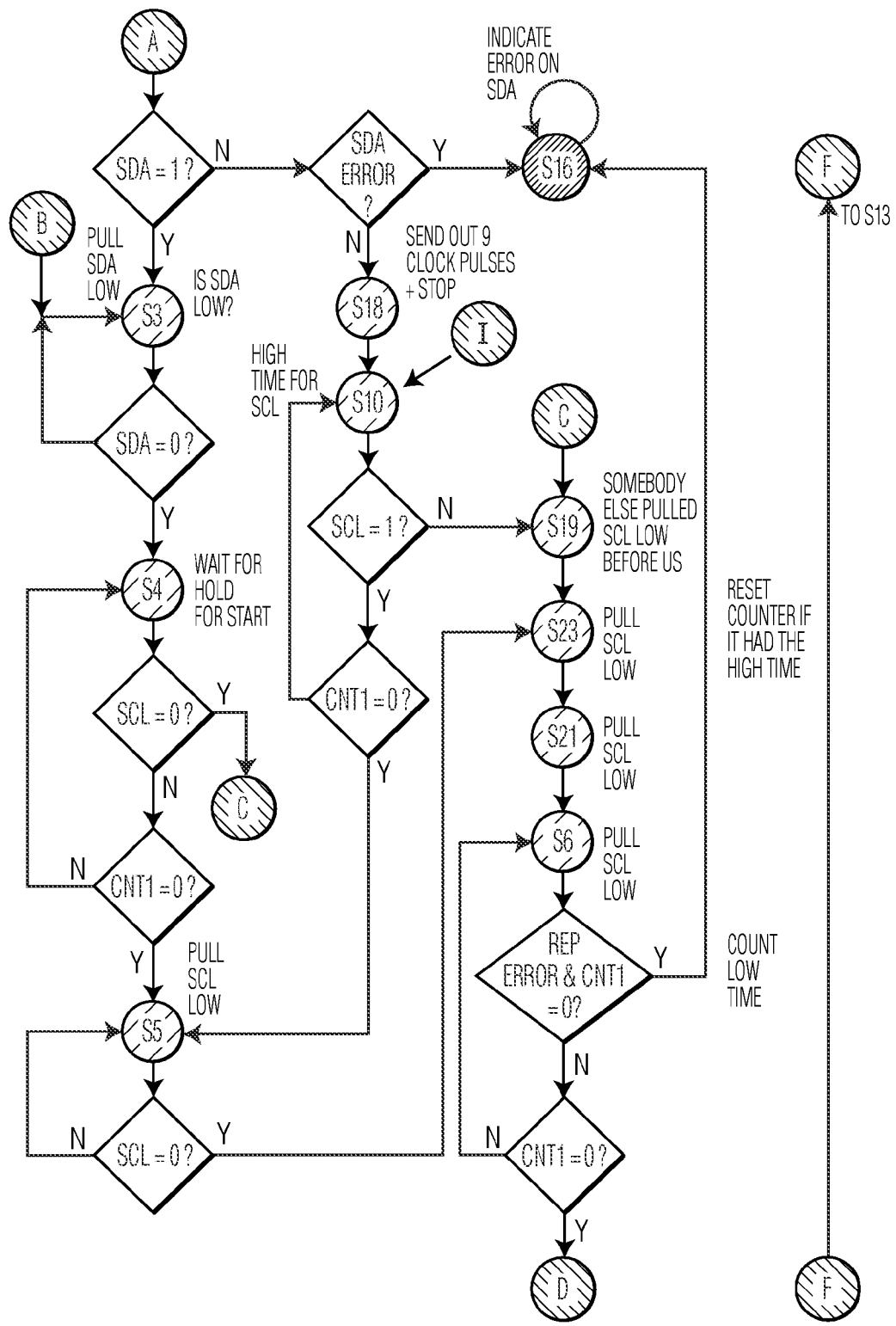
Figure 3C:
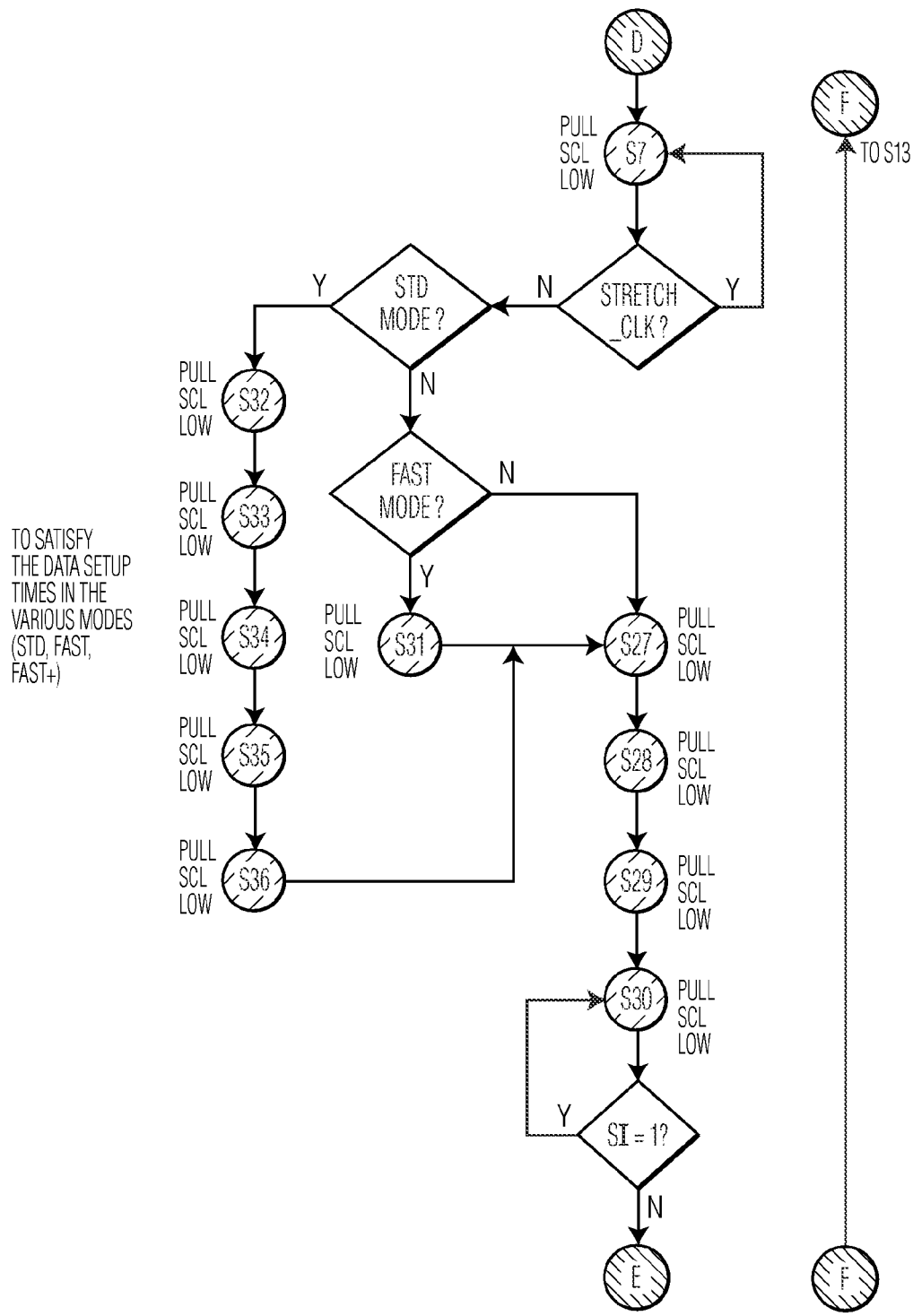
Figure 3D:
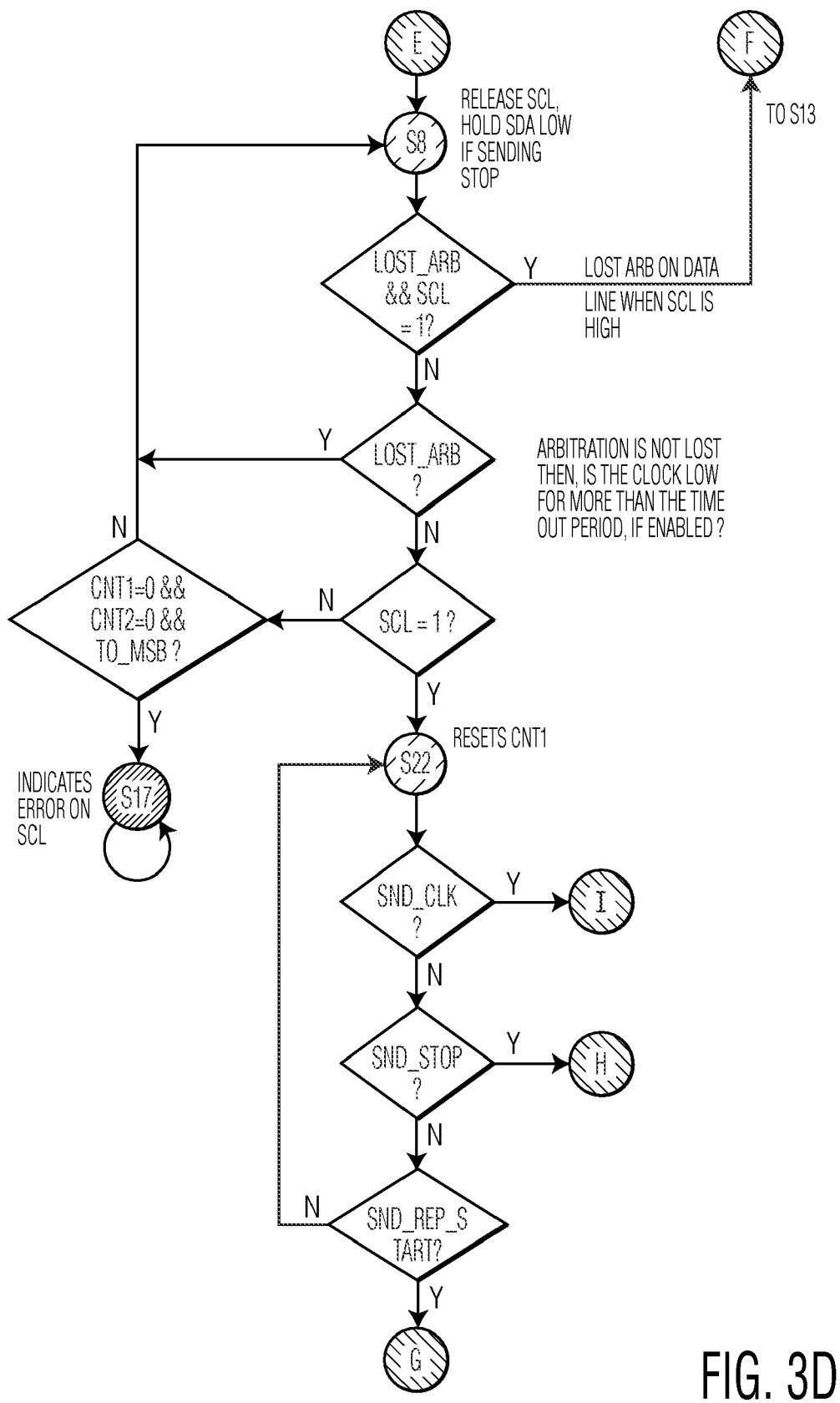
Figure 3E:
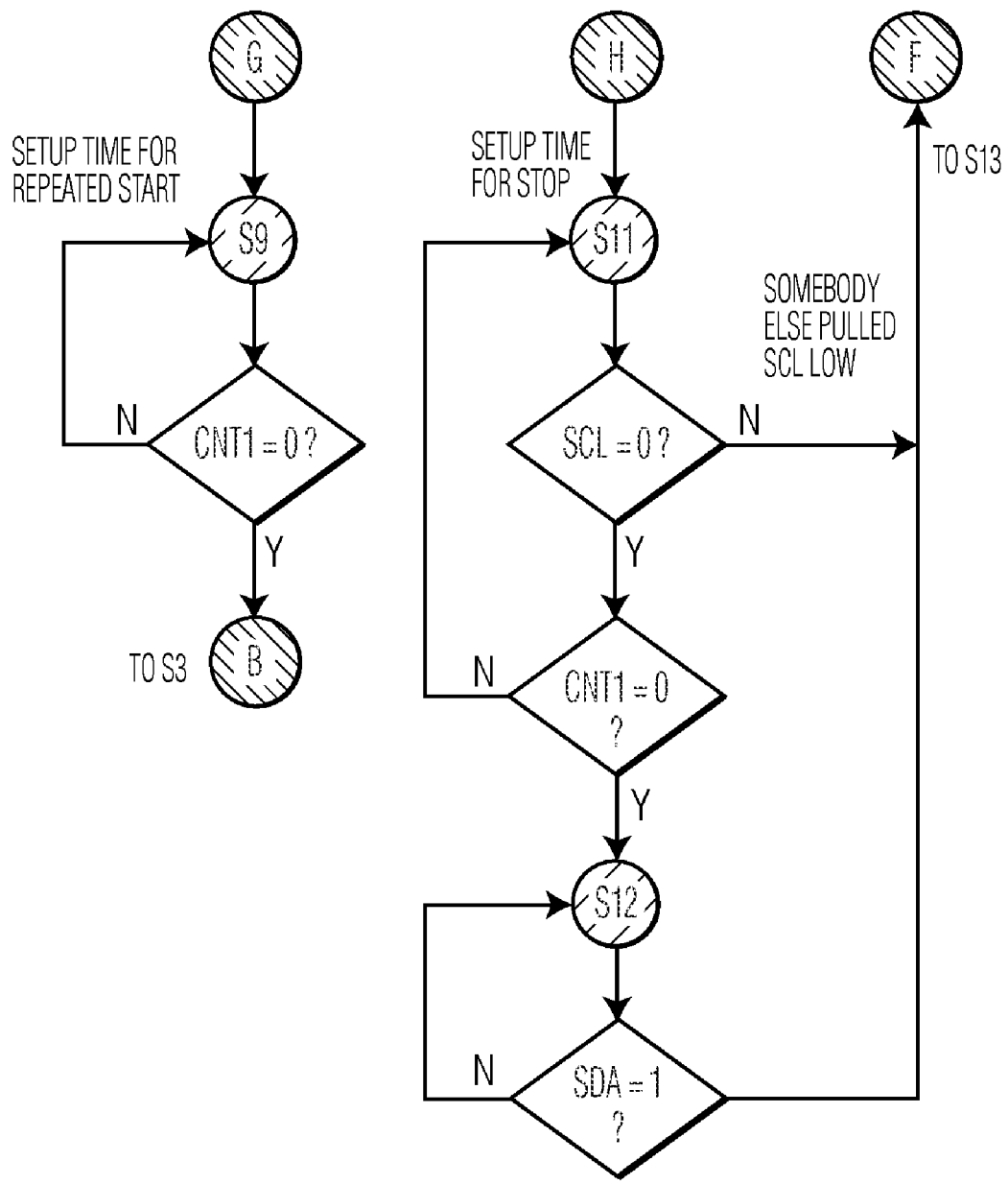

The invention may be more completely understood in consideration of the following detailed description of various embodiments of the invention in connection with the accompanying drawings, in which:

FIG. 1 shows a block diagram of an I²C system configured for Standard, Fast and Fast-Plus modes, according to an example embodiment of the present invention;

FIG. 2 shows a flow diagram of an approach for generating a clock signal that is compatible with the Fast-Plus mode specification, according to an example embodiment of the present invention; and FIGS. 3A-3E show a schematic diagram of a state machine used to generate a clock signal that is selectively compatible with the Standard mode, Fast mode and Fast-Plus mode specifications, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of I²C devices and approaches involving I²C Fast-Plus mode devices. While the present invention is not necessarily limited to such applications, an appreciation of various aspects of the invention is best gained through a discussion of examples in such an environment.

Consistent with an example embodiment of the present invention, a state machine is implemented to generate a clock signal that is between about 400 KHz and 1 MHz. A first state of the state machine determines whether to implement a clock stretching delay. A second state of the state machine determines whether the I²C bus is configured to run in a standard clock mode or in another one of multiple faster clock modes including a fast clock mode or a fast-plus clock mode. If the device is not configured to run in either the standard clock mode or the fast clock mode, a third state of the state machine drives the clock signal in one binary logic state for more than about 0.5 microseconds and less than about 2.5 microseconds before allowing the clock signal to be driven in the other binary logic state and allowing the clock signal to remain in the other binary logic state for more than about 0.5 microseconds and less than about 2.5 microseconds. The device can repeat these states to produce a clock signal between 400 KHz and 1 MHz.

Consistent with another example embodiment of the present invention, a state machine generates the I²C clock (SCL) for I²C bus transactions. The state machine also generates the START and STOP conditions on the I²C bus to begin and end communication, respectively. It synchronizes its clock with other clocks on the SCL line. The state machine also allows for clock stretching. The state machine is capable of generating timing for three different I²C frequency modes, Standard, Fast and Fast-Plus modes. The state machine provides a time-out feature that is programmable and that is used to gracefully recover from an error condition. The state machine responds to an enable signal that is used to determine whether to implement the time-out feature. When this feature is enabled, the state machine waits a period of time equivalent to the time-out value before indicating an error on the I²C bus.

Turning now the figures, FIG. 1 shows a block diagram of an I²C system for Standard, Fast and Fast-Plus modes, according to an example embodiment of the present invention. I²C device 102 implements three I²C clock modes, Standard 104, Fast 106 and Fast-Plus 108. These modes determine the rate at which the clock signal 110 (SCL) and data signal 112 (SDA) are provided on the I²C bus. Standard Mode 104 uses a clock that is less than about 100 KHz; Fast Mode 106 uses a clock that is less than about 400 KHz, and Fast-Plus mode 108 uses a clock that is less than about 1 MHz. The generated SCL 110 clock is received by device(s) 114 and used in conjunction with SDA 112 to transmit data between devices.

FIG. 2 shows a flow diagram of an approach for generating a clock signal that is compatible with the Fast-Mode plus specification, according to an example embodiment of the present invention. FIG. 2 depicts output modes 202, 208, 212, 214 and 216 as well as decision blocks 204, 206 and 210. These states and decisions blocks are implemented, for example, by a state machine of a master I²C device. The state machine can be designed and implemented using programmable logic, discrete circuitry, software implemented via a processor and any similar method.

The state machine enters output mode 202 upon determining that the device requires the generation of a clock signal. Such determinations are based upon the I²C specification and include situations such as responding to another I²C device and requesting data from another I²C device. During output mode 202 the clock signal is driven to a logical low value.

Decision block 204 maintains the low logic value during the time that clock stretching is to be implemented. Upon determining that clock stretching is not needed, decision block 206 determines whether the device is configured for Standard mode. If the device is configured for Standard mode, the state machine proceeds to output mode 208 where a Standard mode delay is implemented. Otherwise, the state machine proceeds to decision block 210, which determines whether the device is configured for Fast mode. If the device is configured for Fast mode, the state machine proceeds to output mode 212 where a delay for Fast mode is implemented. Otherwise, the state machine proceeds to output mode 214 where a delay for Fast-Plus mode is implemented. Upon completion of the appropriate clock delay, the state machine proceeds to output mode 216 where the clock is released for an amount of time consistent with the mode determined by decision blocks 206 and 210. The entire process can then be repeated to generate a clock signal for the SCL line.

FIG. 2 shows the output modes 208, 212 and 214 implemented sequentially for Standard mode and outputs modes 212 and 214 implemented sequentially for Fast mode. For instance, the total clock delay for a device operating in Standard mode is the sum of delays of output modes 208, 212 and 214. Such a sequential operation can be particularly useful for reducing the complexity of the state machine by reusing the delays of output modes 212 and 214 for Standard or Fast mode. In other embodiments, each delay can be independent of the other delays by, for example, implementing the entire delay in one output mode for each clock mode.

FIGS. 3A-3E show a schematic diagram of a state machine used to generate a clock signal that is selectively compatible with the Standard mode, Fast mode and Fast-Plus mode specifications, according to an example embodiment of the present invention. The state machine generates the SCL clock for I²C bus transactions. It also generates the START and STOP conditions on the I²C bus to begin and end communication, respectively. It synchronizes its clock with other clocks on the SCL line. The state machine also allows clock stretching. The state machine is capable of generating timing for three different I²C frequency modes, Standard, Fast and Fast-Plus modes. The state machine uses one or more counters throughout the various states. For simplicity, the following description describes one counter used throughout, however, this is not meant to be limiting as multiple counters can be used for the various delays.

The state diagram shows 36 states (S1-S36) and indicates the order in which events should occur in to produce the correctly timed signals on the I²C bus. The following is a description of the various states and how they achieve the correct I²C behavior.

S0—On reset, the state machine goes to state S0. This is the state machine's default state. While in this state, if the state machine detects a START condition on the I²C bus, it goes into state S13, which indicates that the bus is busy (e.g., the bus is being used by another master.) If the state machine receives a signal to send a START condition, it goes into state S1.

S1—While in this state, if the state machine detects a START condition on the I²C bus, it goes to state S13, the bus busy state. Otherwise, the state machine checks the SCL line to make sure it is high. A high on the SCL line indicates that the previous device has released the I²C bus and the state machine goes to state S2. If the time-out operation has been enabled and the SCL line is low (i.e. the SCL line has not been released by another device), the state machine starts counting the time-out period. If the time-out operation has not been enabled, the state machine stays in state S1 till either the SCL line is released or a START condition is detected on the bus. Upon completion of the time-out period, if the SCL line is still low, the state machine goes to state S17 to indicate an error on the SCL line of the I²C bus.

S2—If the state machine detects a START condition, it goes to state S13, the bus busy state. Otherwise it checks the SDA line. If the SDA line is high, i.e. no other device on the I²C bus is holding it low, the state machine goes to state S3. If the SDA line is detected to be low, it is assumed that some slave is pulling the line low and therefore the state machine proceeds to state S18, where it tries to send out nine clock pulses to synchronize a stuck slave that might be causing the line to go low. If, after the 9 clock pulses, the SDA line is still stuck low, the state machine goes to state S16 to indicate an error on the SDA line.

S3—In state S3, the SDA line is pulled low in order to generate a START condition on the I²C bus. After the state machine detects that SDA has gone low on the I²C bus, it goes to state S4, otherwise, it stays in state S3. This detection ensures that the voltage level on the SDA line has reached a sufficiently low voltage, according to the I²C specification.

S4—The counter counts the hold time for the START condition. If the SCL line goes low before the counter has finished counting, the state machine goes to state S19, otherwise, it goes to state S5 after finishing the count.

S5—In state S5, the SCL line is pulled low. Once the state machine detects the low level of the SCL line, it goes to state S23. This detection ensures that the voltage level on the SCL line has reached a sufficiently low voltage, according to the I²C specification.

S6—In state S6, the counter counts the low period of the SCL clock. Upon completion of the counting, the state machine goes to state S7. In case of an SDA error, (i.e. where the state machine is sending out 9 clock pulses and the SDA line is still held low), the state machine goes to state S16 to indicate an error on the SDA line.

S7—The state machine stays in state S7 for as long as the SCL clock needs to be stretched. It goes to the next state based on the I²C mode of the master; Standard mode, Fast mode or Fast-Plus mode. It goes to state S32 when in Standard mode, in state S31 in Fast mode and in state S27 in Fast-Plus mode.

S8—In state S8 the SCL line is released. This state also decides whether the master has lost arbitration or not. When arbitration is lost, the state machine goes to state S13. If the time-out operation has been enabled, the counter counts the time-out period beginning after the release of the SCL line. If the SCL line is not released after the time-out period, the state machine goes to state S17, which indicates that there is a problem with the SCL line stuck low. If the time-out operation is not enabled, and the SCL line gets stuck low, the state machine stays in state S8 and needs to be externally reset to get out of this state. When the SCL line is released successfully, the state machine goes to state S22.

S9—In this state, the counter counts the set-up time for a repeated START condition. Upon completion of that counting the state machine goes to state S3.

S10—In this state the counter counts the high period of the SCL clock. If the SCL line goes low before the counter is done counting, the state machine goes to state S19. When the counter is done counting, the state machine goes to state of S5.

S11—In state S11, the state machine counts the set-up time for a STOP condition. If the SCL line goes low before the counter is done counting, then the state machine goes to state S13 or the bus busy state. This means that although the master wanted to send a STOP condition on the I²C bus, some other master wanted to continue sending clock pulses on the SCL line. If the counter successfully finishes counting, the state machine goes to the next state of S12.

S12—In this state, the SDA line is released in order to generate a STOP condition on the I²C bus. The state machine goes to next state of S13.

S13—In state S13, the state machine looks to see if it detected a STOP condition. If it did, it goes to state S14. If it does not detect a STOP condition on the bus, both SCL and SDA lines are high, the master wants to send out a START condition on the I²C bus and the time-out feature is enabled, the state machine goes to state S20.

S14—In this state the counter counts the bus-free time between a STOP condition and the following START condition. If it detects a START condition on the bus before the counter has finished counting the bus-free time, the state machine goes to the bus-busy state of S13. If the counter finishes counting the bus-free time, the state machine goes to state S24.

S16—State S16 indicates that there is an error condition on the I²C bus where the SDA line is stuck low. The state machine stays in state S16. It needs to be externally reset to get out of this state.

S17—This state indicates that there is a problem with the SCL line stuck low. The state machine stays in this state forever, till it is externally reset.

S18—In this state the counter sets up to send out the 9 clock pulses. The next state is state S10.

S19—In state S19, the state machine gets ready to start counting afresh the low period of the SCL clock. The next state it goes to is state S23.

S20—In state S20, the counter counts the time-out period when enabled. When not enabled, the state machine returns to the bus busy state of S13. If the state machine detects a STOP condition on the bus, it goes to state S26. If the counter finishes counting the time-out period, the state machine goes to state S3, from where the master will take control of the I²C bus by sending a START condition. If, either SCL or SDA go low, then the counter stops counting and the state machine goes back to state S13.

S21—This state is part of a number of such states that provide an internal hold time for the data with respect to the clock. The state machine goes to the next state of S6.

S22—In this state, the state machine decides the next I²C operation. If a control signal indicates that a clock pulse needs to be sent, the state machine goes to state S10. If a control signal indicates that a STOP condition needs to be sent, it goes to state S11. If a control signal indicates that a repeated START condition needs to be sent on the I²C bus, then the state machine goes to state S9.

S23—This state is part of a number of such states that provide an internal hold time for the data with respect to the clock. The state machine goes to the next state of S21.

S24—This state indicates that the I²C bus is in a bus free state. If the state machine detects a START condition on the bus, it goes to the bus busy state S13. If the master wants to send out a START condition on the I²C bus, the state machine goes to state S25.

S25—This state checks to see if the SCL line is high, and if so, it goes to state S3, otherwise to state S17.

S26—This state resets the time-out counter. From here the state machine goes to state S14.

S27-S30—These states provide data setup with respect to the clock for Standard, Fast and Fast-Plus modes. If implemented alone (i.e. without states 31-36), the delay represents the delay for a Fast-Plus mode clock. The next state of the state machine is S8.

S31—This state provides data setup time with respect to the clock for Fast mode. The next state of the state machine is S27.

S32-S36—These states provide data setup time with respect to the clock for Standard mode. The next state of the state machine is S27.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, applications other than an I²C master may be amenable to implementation using similar approaches. Such modifications and changes do not depart from the true scope of the present invention that is set forth in the following claims.

The invention claimed is:

1. For use with an I²C bus having a clock signal, a method of using logic circuitry to control the clock signal on the I²C bus, the logic circuitry arranged in a state machine to implement the method comprising:
   in a first state of the state machine, determining whether to effect a clock stretching delay;
   in a second state of the state machine and in response to determining not to effect a clock stretching delay, determining whether the I²C bus is configured to run in a standard clock mode or in another one of multiple faster clock modes including a fast clock mode;
   in a third state of the state machine and in response to determining that the device is not configured to run in either the standard clock mode or the fast clock mode, driving the clock signal in one binary logic state for more than about 0.5 microseconds and less than about 2.5 microseconds before allowing the clock signal to be driven in the other binary logic state and allowing the clock signal to remain in the other binary logic state for more than about 0.5 microseconds and less than about 2.5 microseconds before driving the clock signal in the one binary logic state.

2. The method of claim 1, wherein the multiple faster clock modes includes a fast clock mode and a fast-plus clock mode.

3. The method of claim 1, further including the step of synchronizing the clock signal to an external signal that is communicatively coupled to the I²C bus.

4. The method of claim 1, further including, in another state of the state machine, detecting and responding to an error in response to a communication on the I²C bus.

5. For use with an I²C bus having a clock signal, a method for controlling the clock signal on the I²C bus, the method comprising:
   determining whether to effect a clock stretching delay;
   in response to determining not to effect a clock stretching delay, determining whether the I²C bus is configured to run in a standard clock mode;
   in response to determining that the device is not configured to run in a standard clock mode, determining whether the I²C bus is configured to run in a fast clock mode; and
   in response to determining that the device is not configured to run in a fast clock mode, driving the clock signal low for more than about 0.5 microseconds and less than about 2.5 microseconds before allowing the clock signal to be driven high and allowing the clock signal to remain high for more than about 0.5 microseconds and less than about 2.5 microseconds before driving the clock signal low.

6. Logic circuitry for controlling a clock signal of an I²C bus, the logic circuitry comprising:
   a state machine means including
   first means for operating in a first state to determine whether to effect a clock stretching delay;
   in response to determining not to effect a clock stretching delay, second means for operating in a second state to determine whether the I²C bus is configured to run in a standard clock mode or in another one of multiple faster clock modes including a fast clock mode; and
   in response to determining that the device is not configured to run in neither the standard clock mode nor the fast clock mode, third means for operating in a third state to drive the clock signal in one binary logic state for more than about 0.5 microseconds and less than about 2.5 microseconds before allowing the clock signal to be driven in the other binary logic state and allowing the clock signal to remain in the other binary logic state for more than about 0.5 microseconds and less than about 2.5 microseconds before driving the clock signal in the one binary logic state.

7. A logic circuit for controlling a clock signal of an I²C bus, the logic circuit comprising:
   a state machine arranged
   in a first state to determine whether to effect a clock stretching delay;
   in response to determining not to effect a clock stretching delay, in a second state to determine whether the I²C bus is configured to run in a standard clock mode or in another one of multiple faster clock modes including a fast clock mode; and in response to determining that the device is not configured to run in either the standard clock mode or the fast clock mode, in a third state to drive the clock signal in one binary logic state for more than about 0.5 microseconds and less than about 2.5 microseconds before allowing the clock signal to be driven in the other binary logic state and allowing the clock signal to remain in the other binary logic state for more than about 0.5 microseconds and less than about 2.5 microseconds before driving the clock signal in the one binary logic state.

8. The logic circuit of claim 7, wherein the multiple faster clock modes includes a fast clock mode and a fast-plus clock mode.

9. The logic circuit of claim 7, wherein the state machine is further arranged to synchronize the clock signal to an external signal that is communicatively coupled to the I$^2$C bus.

10. The logic circuit of claim 7, the state machine is further arranged to, in another state of the state machine, detect and respond to an error in response to a communication on the I$^2$C bus.

11. The logic circuit of claim 7, wherein the multiple faster clock modes includes a fast clock mode and a fast-plus clock mode, the state machine is further arranged to synchronize the clock signal to an external signal that is communicatively coupled to the I$^2$C bus, and the state machine is further arranged to, in another state of the state machine, detect and respond to an error in response to a communication on the I$^2$C bus.

12. The logic circuit of claim 11, wherein driving the clock signal includes driving the clock signal to a low voltage for more than about 0.5 microseconds and less than about 2.5 microseconds before allowing the clock signal to be driven to a high voltage and allowing the clock signal to remain at the high voltage for more than about 0.5 microseconds and less than about 2.5 microseconds before driving the clock signal to the low voltage.

* * * * *